United States Patent
Gierer et al.

(10) Patent No.: US 8,249,787 B2
(45) Date of Patent: Aug. 21, 2012

(54) PROCESS FOR MONITORING THE DIRECTION OF FRICTIONAL DRIVE FROM A VEHICLE TRANSMISSION AT NEAR-ZERO VEHICLE SPEED

(75) Inventors: Georg Gierer, Kressbronn (DE); Christian Popp, Kressbronn (DE); Thilo Schmidt, Meckenbeuren (DE); Klaus Steinhauser, Kressbronn (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 113 days.

(21) Appl. No.: 12/764,472

(22) Filed: Apr. 21, 2010

(65) Prior Publication Data

US 2010/0204893 A1    Aug. 12, 2010

Related U.S. Application Data

(62) Division of application No. 11/770,884, filed on Jun. 29, 2007.

(30) Foreign Application Priority Data

Jul. 1, 2006 (DE) .......................... 10 2006 030 526

(51) Int. Cl.
*G06F 7/00* (2006.01)
*G06F 17/00* (2006.01)
*G06F 19/00* (2011.01)

(52) U.S. Cl. ............... 701/62; 701/51; 701/60; 477/114

(58) Field of Classification Search ............ 701/51, 701/52, 54, 55, 60–62, 64, 65, 69; 180/337; 708/530; 477/93–94, 114, 189, 195, 906, 477/907

See application file for complete search history.

(56) References Cited

U.S. PATENT DOCUMENTS 2,942,497 A * 6/1960 Berck .......................... 475/208
7,136,735 B2 * 11/2006 Carlson et al. ................. 701/51
(Continued)

FOREIGN PATENT DOCUMENTS

DE    197 33 465 A1    2/1998
(Continued)

OTHER PUBLICATIONS

Machine translation of DE 10137902 A1.*

*Primary Examiner* — Thomas H. Tarcza
*Assistant Examiner* — Rami Khatib
(74) *Attorney, Agent, or Firm* — Davis & Bujold, P.L.L.C.

(57) ABSTRACT

A process of monitoring a drive direction of an automatic or automated vehicle transmission at near-zero vehicle speed via an engaged gear. A desired direction of drive of the transmission is determined from an engaged gear at the time the vehicle begins motion. An actual direction of drive is determined from the transmission and, if different from the desired direction of drive, an error signal is produced. The process includes determining the actual drive either from a sensed rotational direction of a transmission input shaft and a sensed rotational direction of a transmission output shaft or a sensed valve setting, a sensed pressure in an transmission electro-hydraulic control system or on a transmission shifting element or from a sensed direction of rotation of a transmission gearset element or from axial movement or force of a transmission constructional element.

7 Claims, 2 Drawing Sheets

U.S. PATENT DOCUMENTS

| | | | | |
|---|---|---|---|---|
| 7,285,074 B2 * | 10/2007 | Gartner et al. | ............... | 477/195 |
| 7,308,837 B2 * | 12/2007 | Miyazaki | ................. | 74/335 |
| 2003/0062009 A1 * | 4/2003 | Nohara et al. | ............ | 123/90.16 |
| 2004/0061603 A1 * | 4/2004 | Mack | ..................... | 340/453 |
| 2005/0075775 A1 * | 4/2005 | Carlson et al. | ................ | 701/51 |
| 2006/0040777 A1 * | 2/2006 | Gartner et al. | ................ | 475/34 |

FOREIGN PATENT DOCUMENTS

| | | |
|---|---|---|
| DE | 101 37 902 A1 | 8/2002 |
| DE | 103 08 218 A1 | 9/2004 |
| DE | 10 2004 046 558 A1 | 4/2006 |
| EP | 1 297 991 A1 | 4/2003 |

* cited by examiner

TABLE WITH DESIRED DIRECTIONS OF ROTATION

| Desired Direction of Frictional Drive | Vehicle Starts to Move | Direction of Rotation n_ab | Direction of Rotation n_t |
|---|---|---|---|
| Forward | Forward | Forward | Forward |
| Reverse | Reverse | Reverse | Forward |
| Forward | Reverse | Reverse | Reverse |
| Reverse | Forward | Forward | Reverse |

| Gear | Switching Elements | | | | |
|---|---|---|---|---|---|
| | A | B | C | D | E |
| 1 | ● | ● | ● | | |
| 2 | ● | ● | | | ● |
| 3 | | ● | ● | | ● |
| 4 | | ● | | ● | ● |
| 5 | | ● | ● | ● | |
| 6 | | | ● | ● | ● |
| 7 | ● | | ● | ● | |
| 8 | ● | | | ● | ● |
| R | ● | ● | | ● | |

Switching Logic

PROCESS FOR MONITORING THE DIRECTION OF FRICTIONAL DRIVE FROM A VEHICLE TRANSMISSION AT NEAR-ZERO VEHICLE SPEED

This application is a divisional application of Ser. No. 11/770,884 filed Jun. 29, 2007, which claims priority from German Application Serial No. 10 2006 030 526.4 filed July 2006.

FIELD OF THE INVENTION

The invention concerns a process for monitoring the direction of frictional drive from an automatic or automated vehicle transmission at near-zero vehicle speeds with the gear engaged.

BACKGROUND OF THE INVENTION

The growing stringency of the requirements for safety in the driving, operation and use of modern vehicles calls for the devotion of increasingly greater efforts of monitoring the driving status of the vehicle. Accordingly, in vehicle transmissions with automatic or automated gear change or transmission change, the monitoring of transmission slippage is part of the state of the art. Inadmissible slippage in the transmission, which originates from other than the process of gear or transmission change, is typically determined by way of a simple plausibility check of the transmission rpm and/or transmission ratios. Inadmissible slippage in the transmission which originates during a gear or transmission change is typically determined by monitoring rpm characteristics or by requiring compliance with transmission rpm and/or transmission tolerance ranges. In both cases, the signals of rpm sensors at the transmission input and at the transmission output are typically analyzed for this purpose. An automatic transmission with a torque converter inserted in the flow of forces between the vehicle drive motor and the transmission as a drive start-off element, for example, typically exhibits a turbine rpm sensor at the transmission input and an output-side rpm sensor at the transmission output. In order to be able to determine transmission slippage at all, in any event, minimum measurable rpm values are necessary, as a function of the specific type of rpm recording system used (sensor type, pulse series and/or interval between pulses). This way that, according to the state of the art, the vehicle, in any event, must move at a certain minimum velocity to produce measurement signals that can be analyzed for the purpose of gear and/or transmission monitoring.

The objective of the present invention is to present a process by way of which, at near-zero speeds, it is possible to monitor whether the preselected direction of travel and/or the direction of frictional drive from the transmission, engaged by the driver of the vehicle, is identical to the actual direction from frictional drive of the transmission.

BRIEF DESCRIPTION OF THE DRAWINGS

The invention will now be described, by way of example, with reference to the accompanying drawings in which.

DETAILED DESCRIPTION OF THE INVENTION

Figures 1A, 1B:
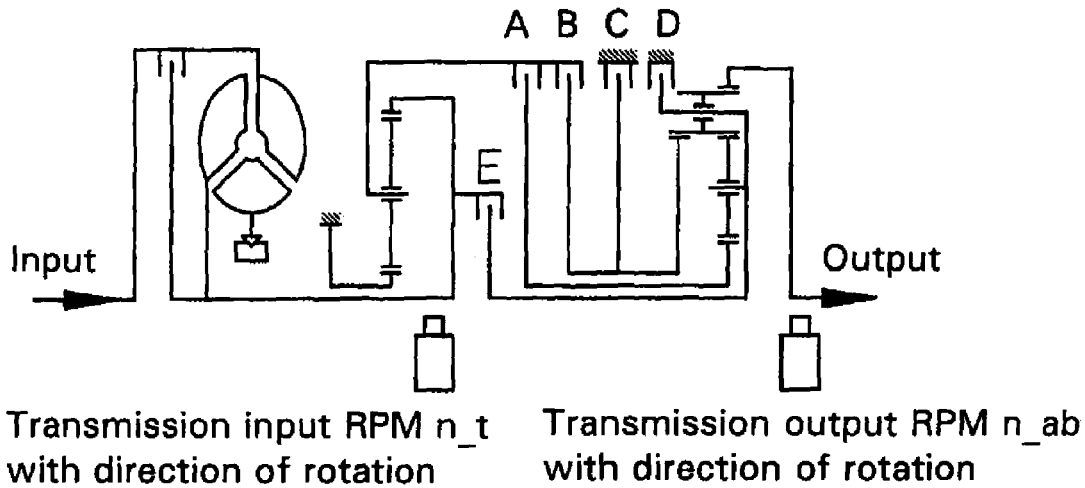
FIG. 1A is a schematic representation of a known automated manual transmission.
FIG. 1B is a Table with the desired directions of rotation of elements of the transmission known from FIG. 1A.

A first embodiment, according to the invention, proposes a process for monitoring the direction of frictional drive from an automatic or automated vehicle transmission at near-zero vehicle speeds with the gear engaged, in which, when the vehicle is standing still or as soon as the vehicle begins to move, a desired direction of frictional drive from the transmission is determined from the engaged gear position, and as soon as the vehicle begins to move, an actual direction of frictional drive from the transmission is determined from a sensed rotational direction of a transmission input shaft and a sensed rotational direction of a transmission output shaft, wherein an error is signaled when the desired direction of frictional drive and the actual direction of frictional drive are not identical.

In an variation of this embodiment, it can be provided that a desired rotational direction of the transmission input shaft and a desired rotational direction of the transmission output shaft are determined from the engaged gear position. As soon as the vehicle begins to move, an actual rotational direction of the transmission input shaft is determined by way of a first sensor and an actual rotational direction of the transmission output shaft is determined by way of a second sensor. The determined actual directions of rotation of the transmission input shaft and the transmission output shaft are compared to the desired directions of rotation of the transmission input shaft and the transmission output shaft and, in the case of a predefined deviation, an error is signaled.

In another variation of the first embodiment according to the invention, it can be provided that, as soon as the vehicle begins to move, an actual rotational direction of the transmission input shaft is determined by way of a first sensor, and an actual rotational direction of the transmission output shaft is determined by way of a second sensor, and that the determined actual directions of rotation of the transmission input shaft and the transmission output shaft are compared to each other, and the comparison of the determined actual directions of rotation of the transmission input shaft and the transmission output shaft is analyzed as a function of the engaged gear position.

Accordingly, in the first embodiment according to the invention, an inventive step is represented by the use of the determined directions of rotation of the transmission input shaft and the transmission output shaft for detection of the actual direction of frictional drive from the transmission, by way of which the vehicle begins to move, irrespective of whether this actual direction of travel of the vehicle corresponds to the direction of travel which the driver of the vehicle has preselected by way of a selection device. If the determined actual direction of frictional drive from the transmission is not identical with the direction of frictional drive and/or direction of travel preselected by the driver, an error is present.

An error recognized in this way which, for example, can originate in the transmission, in the gear position selection device or in the transferring of the signal between the gear position selection device and the transmission, should give rise to a reaction on the part of the transmission and/or the vehicle, by way of a suitable diagnostic function.

The sensor-specific signal recognition threshold for a rotational direction of a shaft is less than the signal threshold at which, or starting from which, the same sensor provides a reliable absolute rpm. A statement as to the rotational direction can theoretically be made after only two signal pulses of the counting disk that belongs to the sensor in question. Accordingly, an especially advantageous feature is that, at the very moment in which the vehicle begins to move, and in which the signal recognition threshold for a rotational direction of the sensor in use is reached and/or exceeded, it is possible to reliably determine whether the direction of frictional drive actually engaged by the transmission is identical to the direction of travel preselected and/or the direction of frictional drive from the transmission engaged by the driver of the vehicle. The distance actually covered by the vehicle up to that point in time will advantageously be relatively small.

Were it to transpire, in contrast to the first embodiment according to the invention, according to the state of the art, that an unequivocal determination of the actual transmission ratio was made, and that only subsequently was a comparison of that actual transmission ratio with a desired transmission ratio performed. The distance actually covered by the vehicle up to the point of recognition of the error would be considerably longer, especially if the transmission ratio of the vehicle were large. In addition, if the transmission ratios in the forward and reverse directions of travel are similar, it would be necessary, in determining the transmission ratio on the basis of the rpm actually measured at the transmission input and the transmission output, according to the state of the art, to take into account relatively large tolerance ranges in order to arrive at a reliable conclusion of whether the vehicle has actually started to move in the wrong direction.

If a second set of gears with a reversal of rotation is not installed between the motor and the transmission, the rotational direction of the transmission input shaft, when the vehicle begins to move on a level plane, provided that the gear position is engaged and the transmission of power in the transmission exists, is always identical to the rotational direction of the engine crankshaft. On the other hand, the rotational direction of the transmission output shaft is a function of the direction of frictional drive actually engaged in the transmission. In most vehicle transmission systems, the directions of rotation of the transmission input shaft and the transmission output shaft are identical when a gear position corresponding to a forward direction of travel and/or a forward gear is actually engaged in the transmission, and the aforesaid directions of rotation are opposite when a gear position corresponding to a reverse direction of travel and/or a reverse gear is actually engaged in the transmission. An example of a plausibility check of the direction of frictional drive from the transmission by way of the rotational direction of the transmission input shaft and the transmission output shaft is shown in FIGS. 1A, 1B; this example shows an automated manual transmission known from the prior art, with six forward gears and one reverse gear.

Accordingly, in the process of the first embodiment according to the invention, it can be provided that an error is signaled when the determined directions of rotation of the transmission input shaft and the transmission output shaft are different and a gear position corresponding to a forward direction of travel is engaged, and that an error is also signaled when the determined directions of rotation of the transmission input shaft and the transmission output shaft are identical and a gear position corresponding to a reverse direction of travel is engaged.

A second embodiment task according to the invention, proposes a process for monitoring the actual direction of frictional drive from an automatic or automated vehicle transmission at near-zero vehicle speeds with the gear engaged, in which, when the vehicle is standing still or as soon as the vehicle begins to move, a desired direction of frictional drive from the transmission is determined from the engaged gear position and, when the vehicle is standing still or as soon as the vehicle begins to move, an actual direction of frictional drive from the transmission is determined from a sensed valve setting of hydraulic or electro-hydraulic valves of an electro-hydraulic control of the transmission, wherein an error is signaled when the desired direction of frictional drive and the actual direction of frictional drive are not identical.

To this end, it can be provided that when the vehicle is standing still or as soon as the vehicle begins to move, a desired valve setting of those hydraulic or electro-hydraulic valves of an electro-hydraulic control of the transmission, which should be actuated according to the gear position engaged, is determined, and that, when the vehicle is standing still or as soon as the vehicle begins to move, an actual valve setting of those valves is sensed, and that, when a predefined deviation exists between the desired valve setting and the actual valve setting of these valves, an error is signaled.

An error can also be signaled if, when the vehicle is standing still or as soon as the vehicle begins to move, hydraulic or electro-hydraulic valves in the electro-hydraulic control of the transmission, which should not be actuated according to the gear position engaged, are actually actuated.

If the desired direction of frictional drive and the actual direction of frictional drive are determined while the vehicle is standing still, it is possible, in an especially advantageous way, to arrive at a reliable determination, even before the vehicle actually begins to move, whether the vehicle would move in an undesirable direction if the driver were to release the vehicle brake when the gear position is engaged.

An error recognized in this way, which, for example, can originate in the transmission, in the gear position selection device or in the signal transfer between the gear position selection device and the transmission, should cause action on the part of the transmission and/or the vehicle, by way of a suitable diagnostic function.

Preferably, the actual valve setting is determined by way of position sensors. In order to perform a plausibility check of the direction of frictional drive actually present from the vehicle transmission and/or the direction of travel actually generated by the transmission, when the vehicle is at or near a standstill and with the gear position and/or the gear preselected by the driver, according to the second embodiment proposed by the inventors, the valve setting of those valves that are relevant to the realization of the preselected gear position and/or the preselected direction of frictional drive is determined by way of position measurements on the hydraulic valves in the electro-hydraulic transmission control. In this way, on one hand, the electrical and/or pressure-related actuation of these valves is directly monitored; on the other hand, the pressurization of the transmission switching elements, which should be switched in and/or engaged according to the preselected gear position and/or the preselected gear, is also indirectly monitored. To this end, position sensors of the type customarily found in the trade may be used to monitor the valve settings according to the invention. Position sensors are known to be mechanically robust and relatively inexpensive. In addition, the requirements with regard to accuracy of the position sensors, for the purpose of monitoring the valve settings according to the invention, are not particularly high.

Obviously, a person skilled in the art will determine the number and arrangement of the position sensors required for monitoring the valve settings in accordance with the transmission type and the actual application in question, and will thereby reduce the number of position sensors to a minimum.

Figures 2A, 2B:
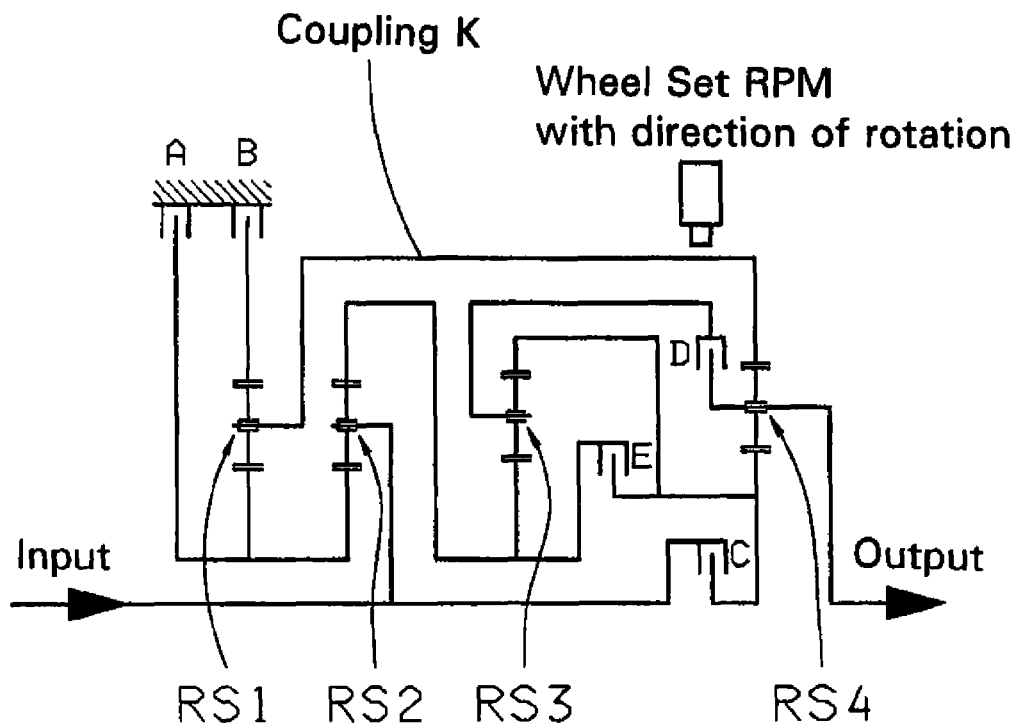
FIG. 2A is a schematic representation of an automated manual transmission.
FIG. 2B is a switching diagram of the automated manual transmission of FIG. 2A.

On the basis of an example consisting of a relatively modern automated manual transmission with eight forward gears and one reverse gear, which are selectable according to the switching logic set forth in FIG. 2B, an example of a plausibility check of the direction of frictional drive from the transmission by way of monitoring of the valve settings is explained in detail below. As may be seen in FIGS. 2A and 2B, in this embodiment three switching elements are engaged in each gear, wherein in each forward gear actually engaged in the transmission at least one of the two switching elements C, E is switched in and/or engaged. In this way, monitoring the valve settings of hydraulic or electro-hydraulic valves in the electro-hydraulic transmission control, which act on the aforesaid switching elements C and E, reliably enables an unequivocal determination with regard to whether a forward gear is actually not engaged and/or not actually switched in, within the transmission. Specifically, if neither of the two switching elements C, E is actuated by pressurization, the transmission, in any case, has no traction in the forward direction of travel. In the present embodiment, in order to arrive at a reliable and unequivocal conclusion as to whether the transmission actually has or does not have traction in the forward direction or in the reverse direction, it is necessary, for the purpose of monitoring the valve settings according to the invention, to add a third position sensor, which senses the valve setting of a hydraulic or an electro-hydraulic valve in the electro-hydraulic transmission control, which acts on the switching element D. On one hand, the sensed valve setting of the valve that acts on the switching element D may be used to determine whether the reverse gear is actually not engaged in the transmission. On the other hand, the sensed valve settings of the three switching elements C, D and E, in combination, may be used to determine whether the transmission is actually free of traction.

A third embodiment, according to the invention, proposes a process for monitoring the actual direction of frictional drive from an automatic or automated vehicle transmission at near-zero vehicle speeds with the gear engaged, in which, when the vehicle is standing still or as soon as the vehicle begins to move, a desired direction of frictional drive from the transmission is determined from the engaged gear position and, when the vehicle is standing still or as soon as the vehicle begins to move, an actual direction of frictional drive from the transmission is determined from a pressure that is sensed in an electro-hydraulic control of the transmission or on a switching element of the transmission, whereby an error is signaled when the desired direction of frictional drive and the actual direction of frictional drive are not identical.

In an especially advantageous manner, by way of the embodiment described above, it is possible to arrive at a reliable conclusion, even before the vehicle actually begins to move, of whether the vehicle would move in an undesirable direction if the driver were to release the vehicle brake when the gear position is engaged.

In order to perform a plausibility check of the direction of frictional drive actually present from the vehicle transmission and/or the direction of travel of the vehicle actually generated by the transmission, when the vehicle is at or near a standstill and with the gear position and/or the gear preselected by the driver, according to the third embodiment proposed by the inventors, the pressure on the switching elements of the transmission that are relevant to the realization of the preselected gear position and/or the preselected direction of frictional drive is monitored. An error is recognized when the actual pressures on the switching elements of the transmission that should be free of traction on the basis of the gear position engaged by the driver exceed a defined threshold value. To this end, both pressure sensors and simply constructed pressure switches may be used for the purpose of pressure monitoring.

An error recognized in this way, which, for example, can originate in the transmission or in the gear position selection device or in the signal transfer between the gear position selection device and the transmission, should give rise to a reaction on the part of the transmission and/or the vehicle in terms of a suitable diagnostic function.

Obviously, a person skilled in the art will determine the pressure sensors and/or pressure switches required for pressure monitoring in accordance with the transmission type and the actual application in question and will thereby reduce the number of position sensors to a minimum. Similarly, a person skilled in the art will determine, in accordance with the transmission type and the actual application in question, where in the hydraulic branch of the pressure actuation of the switching element, on which pressure monitoring is to be performed, the respective pressure sensor and/or pressure switch is to be placed.

On the basis of the example consisting of a relatively modern automated manual transmission with eight forward gears and one reverse gear according to FIG. 2A, an example of a plausibility check of the direction of frictional drive in the transmission by way of the pressure monitoring of transmission switching elements is explained in detail below. As may be seen in FIG. 2B, in this practical example three switching elements are included in each gear, wherein in each forward gear actually engaged in the transmission, at least one of the two switching elements C, E is switched in and/or engaged. In this way, the pressure monitoring of the aforesaid switching elements C and E enables an unequivocal determination with regard to whether a forward gear is actually not engaged and/or not actually switched in in the transmission. In order to arrive at an unequivocal determination as to whether the transmission actually has or does not have traction in the forward direction or in the reverse direction, in the present practical example, it is necessary to monitor the pressure on the switching element D as well. On one hand, the pressure monitoring of the switching element D may be used to derive a determination as to whether the reverse gear is actually not engaged in the transmission. On the other hand, the pressure monitoring of the three switching elements C, D and E, in combination, may be used to derive a determination as to whether the transmission is actually free of traction. The question of which of the three switching elements C, D and E, for the purpose of pressure monitoring according to the invention, should reasonably be equipped with a pressure sensor, and which of the three switching elements C, D and E, for the purpose of pressure monitoring, according to the invention, requires only a simple pressure switch, will be determined by a person skilled in the art on the basis of the concrete application in question. Such a person will also take into account other functions and requirements of the transmission, which do not constitute an object of the present invention.

In a fourth embodiment task according to the invention, proposes a process for monitoring the actual direction of frictional drive of an automatic or automated vehicle transmission at near-zero vehicle speeds with the gear engaged, in which, when the vehicle is standing still or nearly still, a desired direction of frictional drive from the transmission is determined from the engaged gear position and, when the vehicle is standing still or nearly still, a transmission direction of frictional drive from the transmission is determined from a sensed rotational direction of a gearset element of the transmission, whereby an error is signaled when the desired direction of frictional drive and the actual direction of frictional drive are not identical.

The desired direction of frictional drive from the transmission, as set forth above, can be indicated by a desired rotational direction of the aforesaid gearset element. To this end, it can be provided that, on the basis of the engaged gear position, a desired rotational direction of the gearset element is determined, that an actual rotational direction of a gearset element of the transmission is determined by way of a first sensor, that the desired rotational direction and the actual rotational direction of the aforesaid gearset element are compared with one another and, in the case of a predefined deviation, an error is signaled.

In an especially advantageous manner, by way of the embodiment described above, it is possible to arrive at a reliable conclusion, even before the vehicle actually begins to move, as to whether the vehicle would move in an undesirable direction if the driver were to release the vehicle brake when the gear position is engaged.

The fourth embodiment is a function of the respective gearset element of the transmission—that is, as a function of the respective kinematics of the transmission—there is, in most cases, at least one gearset element which rotates even when the vehicle is standing still, that is, when the transmission output shaft is not moving, if a drive position in the transmission is engaged in a forward or reverse direction. If several gearset elements of the transmission rotate when the vehicle is standing still and a drive position is engaged, a person skilled in the art, on the basis of the transmission and gearset system in question, will make an appropriate choice as to the gearset element and which rotational direction should be determined. Naturally, such a choice will take into consideration the corresponding absolute rpm values and sensor signal thresholds. In so doing, the person skilled in the art will obviously also endeavor to use, for the process according to the invention, at least one rpm sensor that is already present. In any event, the person will at least, if at all possible, limit the number of additional rpm sensors to one.

According to the invention, in cases in which the transmission does not exhibit any gearset element that rotates when the vehicle is standing still or when the transmission output shaft is not moving, a defined gearset element will be set in rotation when the vehicle is standing still or when the transmission output shaft is not moving, by way of a dedicated actuation by one of the transmission switching elements, and will be kept rotating at least until the actual direction of frictional drive from the transmission is determined and/or verified. The selection of which transmission switching element to use for this purpose and the definition of the necessary slippage value on the switching element selected will be made by the person skilled in the art on the basis of the actual gearset system of the transmission. Naturally, such actuation of the transmission switching element must not lead to the stalling of the drive motor connected or effectively connected to the transmission input shaft. Furthermore, it must not compromise, let alone damage, the other functions of the transmission.

Accordingly, in the fourth embodiment, an inventive step is represented by the use of the measured rotational direction of a predefined gearset element, such as the measured rotational direction of a ring gear in a planetary gearset of the transmission, in order to detect the actual direction of frictional drive from the transmission, by way of which the vehicle would begin to move, irrespective of whether this actual direction of travel of the vehicle corresponds to the direction of travel which the driver of the vehicle has preselected by way of a selection device. If the determined actual direction of frictional drive from the transmission is not identical to the direction of frictional drive and/or direction of travel preselected by the driver, an error is present, which can originate in the transmission, in the gear position selection device or in the signal transfer between the gear position selection device and the transmission, and which should give rise to a reaction on the part of the transmission and/or the vehicle, by way of a suitable diagnostic function.

On the basis of the example consisting of an automated manual transmission with eight forward gears and one reverse gear according to FIG. 2A, an example of a plausibility check of the direction of frictional drive the transmission by way of monitoring the rotational direction of a gearset element of the transmission is explained in detail below. In this automated transmission, for example, with four planetary gearsets RS1, RS2, RS3, RS4, which are coupled to each other, the rotational direction of coupling shaft K, which provides a constant connection between the carrier of the first planetary gearset RS1 and the ring gear of the fourth planetary gearset RS4, may be used to make a determination with regard to the actual direction of frictional drive in the transmission when the drive position is engaged. According to FIGS. 2A and 2B, the schematic diagram of the transmission and the relevant switching logic, the aforesaid coupling shaft K is normally still, when the drive position is engaged and the frictional drive in the transmission has been completely produced. If one of the forward gears 1 through 5 is actually engaged in the transmission and switching element B is now brought into slippage, the coupling shaft K will rotate in a direction opposite to that of the transmission input shaft. Because the rotational direction of the transmission input shaft is known (it is generally the same as that of the crankshaft of the vehicle's combustion engine), it is possible, and comparatively simple to determine, in this way, the transmission direction of frictional drive from the transmission in all of the forward gears that may reasonably be engaged when the vehicle is standing still. If the reverse gear R is actually engaged in the transmission and switching element B is now brought into slippage, the coupling shaft K will rotate in the same direction as the transmission input shaft.

Should it happen that, upon the engagement of a drive position corresponding to one of the forward gears 1 through 5 or the reverse gear, the frictional drive in the transmission is produced by the aforesaid switching element B, meaning that switching element B is the "frictional drive-producing switching element of the transmission", it is possible, before switching element B is engaged, to determine the actual rotational direction of coupling shaft K, which will still be rotating, and to compare it with a desired rotational direction of coupling shaft K. In so doing, the desired rotational direction of the coupling shaft indicates the desired direction of frictional drive from the transmission and is a function of the direction of travel preselected, and/or the gear position engaged, by the driver of the vehicle by way of the gear position selection device. On the other hand, if a moving vehicle is braked to a standstill and if, in this state, the correspondence of the actual direction of frictional drive from the transmission to the direction of frictional drive preselected by the driver is verified, switching element B, which was selected within the framework of the function according to the invention, must be disengaged by way of a dedicated actuation or at least brought into slippage to the extent that coupling shaft K, which is provided for determination of the rotational direction, rotates at a speed sufficient to enable measurement of a usable rpm signal on the coupling shaft. A pressure drop of this type on switching element B may also be a component part of another transmission function, such as "standby control" or "neutral idle control", so that the programming-related additional efforts required for the function, according to the invention, remain relatively slight.

Finally, a fifth embodiment according to the invention, proposes a process for monitoring the actual direction of frictional drive from an automatic or automated vehicle transmission at near-zero vehicle speeds with the gear engaged, in which, when the vehicle is standing still, a desired direction of frictional drive from the transmission is determined from the engaged gear position and, when the vehicle is standing still, an actual direction of frictional drive from the transmission is determined from a sensed axial movement or a sensed axial force of a constructional element of the transmission, wherein an error is signaled when the desired direction of frictional drive and the actual direction of frictional drive are not identical.

To this end, it can be provided that, on the basis of the engaged gear position, a desired axial movement and/or a desired axial force of the constructional element can be determined; that an actual axial movement and/or an actual axial force of the constructional element of the transmission is determined by way of a first sensor and that the desired axial movement and the actual axial movement and/or the desired axial force and the actual axial force of the aforesaid constructional element are compared with one another and, in the case of a predefined deviation, an error is signaled.

An error recognized in this way should give rise to a reaction on the part of the transmission and/or the vehicle, by way of a suitable diagnostic function.

The fourth embodiment is based on the awareness that, as a function of the respective gearset element of the transmission—that is, as a function of the respective kinematics of the transmission—there is, in most cases, at least one constructional element of the transmission that generates a signed axial force, which varies depending on the specific distribution of torque in the transmission, according to the flow of torque that is actually present. Constructional elements of this type may include a gearset element (for example, a ring gear) of a diagonally toothed planetary gearset, a diagonally toothed spur gear of a spur drive, or a (mechanically activated or pressure-activated) friction switching element. By identifying a constructional element of the transmission that generates an axial force representing the actual direction of frictional drive of the transmission, and by monitoring this signed axial force or the signed axial movement on the constructional element of the transmission that is loaded with the axial force representing the actual direction of frictional drive of the transmission, it is possible to determine, according to the invention, whether the actual direction of frictional drive from the transmission corresponds to the direction of frictional drive and/or direction of travel preselected by the driver through the selection of a drive position.

An axial force can be determined in a manner known from the prior art by way of force-measuring devices of the type customarily found in the trade on a thrust bearing of the transmission that is loaded with an axial force representing the actual direction of frictional drive from the transmission or on a bearing surface of a disc set of a friction switching element in the transmission that is loaded with an axial force representing the actual direction of frictional drive from the transmission. Axial movement can be determined in a manner known from the prior art by way of inductive position-measuring devices of the type customarily found in the trade or by way of a simple electrical limit switch on a diagonally toothed ring gear, on a transfer element connected in a rotationally fixed manner to a gearset element, on a hydraulically and/or pneumatically actuated piston of a transmission switching element, or on a disc or disc set of a transmission switching element.

On the basis of the example consisting of an automated manual transmission with eight forward gears and one reverse gear according to FIG. 2A, an example of a plausibility check of the direction of frictional drive from the transmission by way of monitoring the axial movement of a gearset element of the transmission is explained in detail below. In this automated transmission, for example, with four planetary gearsets RS1, RS2, RS3, RS4, which are coupled to one another, it is relatively simple to provide a position-measuring device on the diagonally toothed ring gear of the fourth planetary gearset RS4, such as an inductive position sensor, which senses the actual axial movement of the aforesaid ring gear. According to the toothwork direction used in the construction of the diagonally toothed ring gear, the aforesaid ring gear, as a result of torsional elasticity and axial play in the transmission, experiences a measurable axial movement in the direction of the transmission output, when the actual direction of frictional drive from the transmission is "forward" and, when the actual direction of frictional drive from the transmission is "reverse", a measurable axial movement in the direction of the transmission input, or vice versa. In this regard, it is significant that the ring gear, when the direction of frictional drive from the transmission is "forward", moves axially in a different direction than when the direction of frictional drive from the transmission is "reverse". A person skilled in the art, in defining the signed desired axial movement of the ring gear on the basis of the drive position preselected by the driver, will take into consideration the toothwork direction actually used in the diagonal toothwork of the ring gear in question. Accordingly, through the use of a position sensor of the type customarily found in trade, it is possible to perform a reliable plausibility check in order to ensure that the actual direction of frictional drive from the transmission corresponds to that desired by the driver, without even starting to move the vehicle.

Instead of the axial movement, it is possible, with the necessary changes having been made, to provide for monitoring of the axial force on the ring gear of the fourth planetary gearset RS4, and/or monitoring of the axial force originating with the diagonally toothed ring gear of the fourth planetary gearset RS4 on an adjoining thrust bearing. In this case, however, the constructional space required for an axial force measuring device of this type in the area of the thrust bearing must be taken into account. In addition, an axial force measuring device of this type is more expensive than the position-measuring device on the ring gear as set forth above.

Through the use of additional information, as part of the function according to the invention, additional influences generated by the environment and the driving situation, which have an effect on the axial movement and/or the axial force sensed within the framework of the fifth embodiment may be taken into account. Additional information of this type may include a sensed inclination or the angle of inclination of the vehicle and/or the road, a braking signal or braking pressure of the vehicle brake system, gear torques on the driven gears of the vehicle.

All five of the embodiments and/or all of the processes, according to the invention, in an especially advantageous manner, enable very rapid recognition of whether the direction of travel of the vehicle that results from the gear actually engaged in the vehicle transmission and/or the gear ratio actually set in the transmission deviates from the direction of travel preselected and expected by the driver on the basis of the preset drive position. The distance actually traveled by the vehicle in the presence of such an error, up to the moment of recognition thereof, can be effectively minimized by all five of the embodiments. Early recognition of such an error constitutes a significant safety advantage in the operation of the vehicle.

As set forth above, situations in which the actual direction of frictional drive from the transmission, determined according to the invention, is not identical to the direction of frictional drive and/or direction of travel preselected by the driver represent a serious error, either in the transmission itself or in the signal transfer between the gear position selection device and the transmission, and should give rise to a reaction on the part of the transmission and/or the vehicle, by way of a suitable diagnostic function. Measures of this type may include, for example:

- actuation of a warning display that is visually discernible by the driver;
- actuation of a warning signal that is acoustically discernible by the driver;
- activation of a substitution function in the transmission, resulting in an automatic switch to a gear and/or a gear ratio that produces the direction of travel preselected by the driver, and wherein the combination of transmission shifting elements that gave rise to the detective error is forbidden;
- activation of a hydraulic emergency program of the transmission;
- interruption of the frictional drive of the transmission;
- entry in an error log of the transmission;
- automatic actuation of a brake system or an emergency brake in the vehicle.

Obviously, several of the above measures may also be combined with each other.

Furthermore, determination of the actual direction of frictional drive from the transmission is not limited to a certain transmission type. Rather, it may be used universally in automatic and automated transmissions with electro-hydraulic or electro-pneumatic transmission control of any desired constructional type, especially in automated transmissions with and without a torque converter as a drive starting element, in double-clutch transmissions, in automated standard transmissions, in mechanical continuously variable automated transmissions with and without power partitioning, in hydrostatic continuously variable automated transmissions with and without power partitioning. The automatic and automated transmissions may constitute an integral part of a conventional drive train with a combustion engine as the sole prime mover of the vehicle, or may constitute an integral part of a hybrid drive train with a combustion engine and an electrical engine as the prime movers of the vehicle.

The invention claimed is:

1. A malfunction detection process for detecting a malfunction in one of an automatic transmission or an automated transmission of a vehicle when a gear is engaged and the vehicle is motionless or just beginning to move, the process comprising the steps of:

determining a desired direction of the drive from the transmission, depending on an engaged gear, when the vehicle is motionless or just beginning to move;

sensing one of an actual axial movement or an actual axial force of a constructional element of the transmission, normal to a rotational plane of the constructional element, when the vehicle is one of motionless or just beginning to move;

determining an actual direction of the drive from the transmission, depending on the one of the actual axial movement or the axial force of the constructional element of the transmission; and signaling an error when the desired direction of the drive from the transmission is different than the actual direction of the drive from the transmission.

2. The process according to claim 1, further comprising the steps of:

determining a desired axial movement of the constructional element depending on the engaged gear;

determining the actual axial movement of the constructional element of the transmission normal to a rotational plane of the constructional element; and comparing the desired axial movement and the actual axial movement of the constructional element; and signaling an error when the desired axial movement of the constructional element and the actual axial movement of the constructional element meet a predefined deviation.

3. The process according to claim 1, further comprising the steps of:

determining a desired axial force of the constructional element depending on the engaged gear;

determining the actual axial force of the constructional element of the transmission is determined by way of a first sensor; and comparing the desired axial force of the constructional element and the actual axial force of the constructional element; and signaling an error when the desired axial movement of the constructional element and the actual axial movement of the constructional element meet a predefined deviation.

4. The process according to claim 1, further comprising the step of employing a diagonally toothed spur gear of a spur drive of the transmission as the constructional element.

5. The process according to claim 1, further comprising the step of employing a friction control element of the transmission as the constructional element.

6. The process according to claim 1, further comprising the step of performing, if the actual direction of the frictional drive from the transmission is not identical to the desired direction of the frictional drive from the transmission, one or more of:

actuating a warning display that is visually discernible by a driver;

actuating a warning signal that is acoustically discernible by the driver;

actuating a substitution function in the transmission, to automatically switch to at least one of a gear and a gear ratio to one of achieve the desired direction of the frictional drive from the transmission and prevent engagement of transmission control elements causing the error;

actuating a hydraulic emergency program of the transmission;

interrupting drive in the transmission;

entering an error into a transmission log, and automatically actuating one of a brake system and an emergency brake in the vehicle.

7. A malfunction detection process for detecting a malfunction in one of an automatic transmission or an automated transmission of a vehicle when a gear is engaged and the vehicle is motionless or just beginning to move, the process comprising the steps of:

determining a desired direction of the drive from the transmission, depending on an engaged gear, when the vehicle is motionless or just beginning to move;

sensing one of an actual axial movement or an actual axial force of a constructional element of the transmission, normal to a rotational plane of the constructional element, when the vehicle is one of motionless or just beginning to move;

determining an actual direction of the drive from the transmission, depending on the one of the actual axial movement or the axial force of the constructional element normal to the rotational plane of the constructional element; and signaling an error when the desired direction of the drive from the transmission is different than the actual direction of the drive from the transmission; and employing a diagonally toothed ring gear as the constructional element.

* * * * *